US006668377B1

(12) United States Patent
Dunn

(10) Patent No.: US 6,668,377 B1
(45) Date of Patent: *Dec. 23, 2003

(54) SYSTEM FOR PREVIEWING VIDEO TRAILERS

(75) Inventor: Matthew W. Dunn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/350,953

(22) Filed: Jul. 9, 1999

Related U.S. Application Data

(63) Continuation of application No. 08/437,086, filed on May 5, 1995, now Pat. No. 5,945,987.

(51) Int. Cl.[7] .................. H04N 7/173; H04N 5/445; G06F 3/00; G06F 13/00
(52) U.S. Cl. .................. 725/92; 725/53; 707/3
(58) Field of Search ................ 725/37, 38, 39, 725/40, 91, 86, 87, 88, 89, 90, 102, 100, 104, 1, 8, 2, 5; 707/1–10; H04N 5/445, 7/16, 7/173; G06F 3/00, 13/00

(56) References Cited

U.S. PATENT DOCUMENTS

| 4,081,754 A | 3/1978 | Jackson ............ 325/396 |
| 4,203,130 A | 5/1980 | Doumit et al. ............ 358/1 |
| 4,228,543 A | 10/1980 | Jackson ............ 358/191.1 |
| 4,694,490 A | 9/1987 | Harvey et al. ............ 380/20 |
| 4,704,725 A | 11/1987 | Harvey et al. ............ 380/9 |
| 4,706,121 A | 11/1987 | Young ............ 358/142 |
| 4,751,578 A | 6/1988 | Reiter et al. ............ 358/183 |
| 4,908,713 A | 3/1990 | Levine ............ 358/335 |
| 4,947,244 A | 8/1990 | Fenwick ............ 358/86 |
| 4,949,187 A | * 8/1990 | Cohen ............ 348/96 |
| 4,977,455 A | 12/1990 | Young ............ 358/84 |
| 5,038,211 A | 8/1991 | Hallenbeck ............ 358/142 |
| 5,068,734 A | 11/1991 | Beery ............ 358/191.1 |
| 5,133,079 A | 7/1992 | Ballantyne ............ 455/4.1 |

(List continued on next page.)

Primary Examiner—Vivek Srivastava
(74) Attorney, Agent, or Firm—Lee & Hayes, PLLC

(57) ABSTRACT

An interactive entertainment network system has a video-on-demand (VOD) application which enables viewers to select criteria for grouping various video content programs (e.g., movies, games, TV shows, etc.) into manageable sets for convenient review. Once grouped, the previews or "trailers" for the set of programs are displayed. The VOD application permits the viewer to browse the trailers at their own rate, skipping forward to the next trailer or backward to the previous trailer. If the viewer settles on a particular program, the VOD application also allows the user to rent the program immediately from the trailer being displayed on their television set, without returning to a menu or other order screen.

18 Claims, 13 Drawing Sheets

U.S. PATENT DOCUMENTS

| | | | | |
|---|---|---|---|---|
| 5,151,789 A | | 9/1992 | Young | 358/194.1 |
| 5,168,353 A | | 12/1992 | Walker et al. | 358/86 |
| 5,233,654 A | | 8/1993 | Harvey et al. | |
| 4,076,121 A | | 12/1993 | Young | 358/142 |
| 5,297,253 A | * | 3/1994 | Meisel | 345/327 |
| 5,307,173 A | | 4/1994 | Yuen et al. | 358/335 |
| 5,335,079 A | | 8/1994 | Yuen et al. | 358/335 |
| 5,335,277 A | | 8/1994 | Harvey et al. | 380/20 |
| 5,353,121 A | | 10/1994 | Young et al. | 348/563 |
| 5,410,344 A | | 4/1995 | Graves et al. | 348/1 |
| 5,416,508 A | | 5/1995 | Sakuma et al. | 348/3 |
| 5,426,699 A | | 6/1995 | Wunderlich et al. | 380/20 |
| 5,446,490 A | | 8/1995 | Blahut et al. | 348/12 |
| 5,479,266 A | | 12/1995 | Young et al. | 358/335 |
| 5,479,268 A | | 12/1995 | Young et al. | 358/335 |
| 5,483,278 A | | 1/1996 | Strubbe et al. | 348/12 |
| 5,485,197 A | | 1/1996 | Hoarty | 348/12 |
| 5,508,732 A | | 4/1996 | Bottomley et al. | 348/7 |
| 5,524,195 A | | 6/1996 | Clanton, III et al. | 348/12 |
| 5,539,449 A | | 7/1996 | Blahut et al. | 348/7 |
| 5,544,354 A | * | 8/1996 | May et al. | 707/8 |
| 5,550,577 A | | 8/1996 | Verviest et al. | 348/7 |
| 5,555,441 A | | 9/1996 | Haddad | 455/4.2 |
| 5,559,548 A | | 9/1996 | Davis et al. | 348/6 |
| 5,561,708 A | | 10/1996 | Remillard | 379/96 |
| 5,585,866 A | * | 12/1996 | Miller et al. | 725/43 |
| 5,621,456 A | * | 4/1997 | Florin et al. | 725/43 |
| 5,640,193 A | | 6/1997 | Wellner | 348/7 |
| 5,845,267 A | * | 12/1998 | Ronen | 705/40 |
| 5,900,905 A | * | 5/1999 | Shoff et al. | 725/91 |
| 6,005,561 A | * | 12/1999 | Hawkins et al. | 725/38 |
| 6,047,327 A | * | 4/2000 | Tso et al. | 709/232 |

* cited by examiner

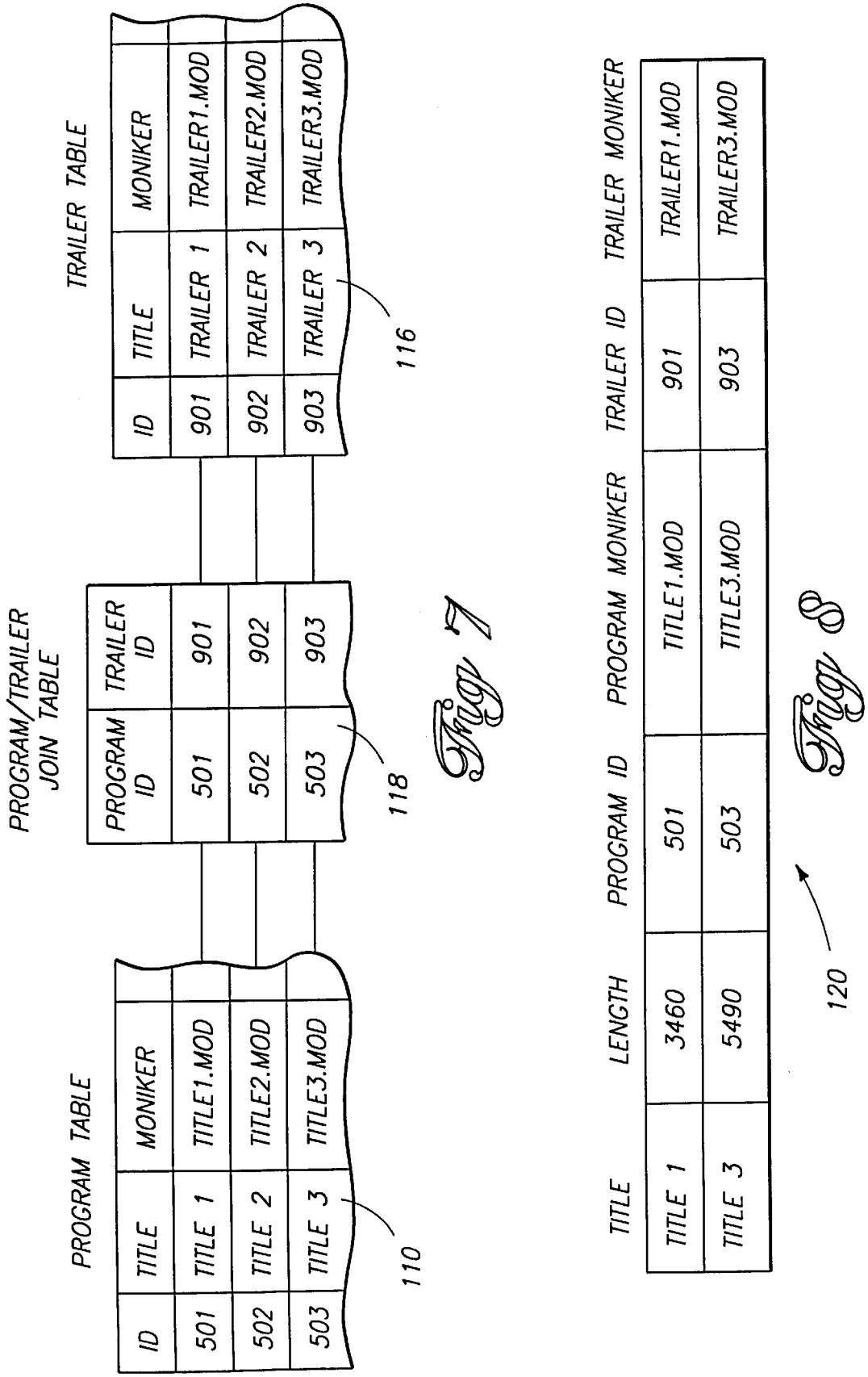

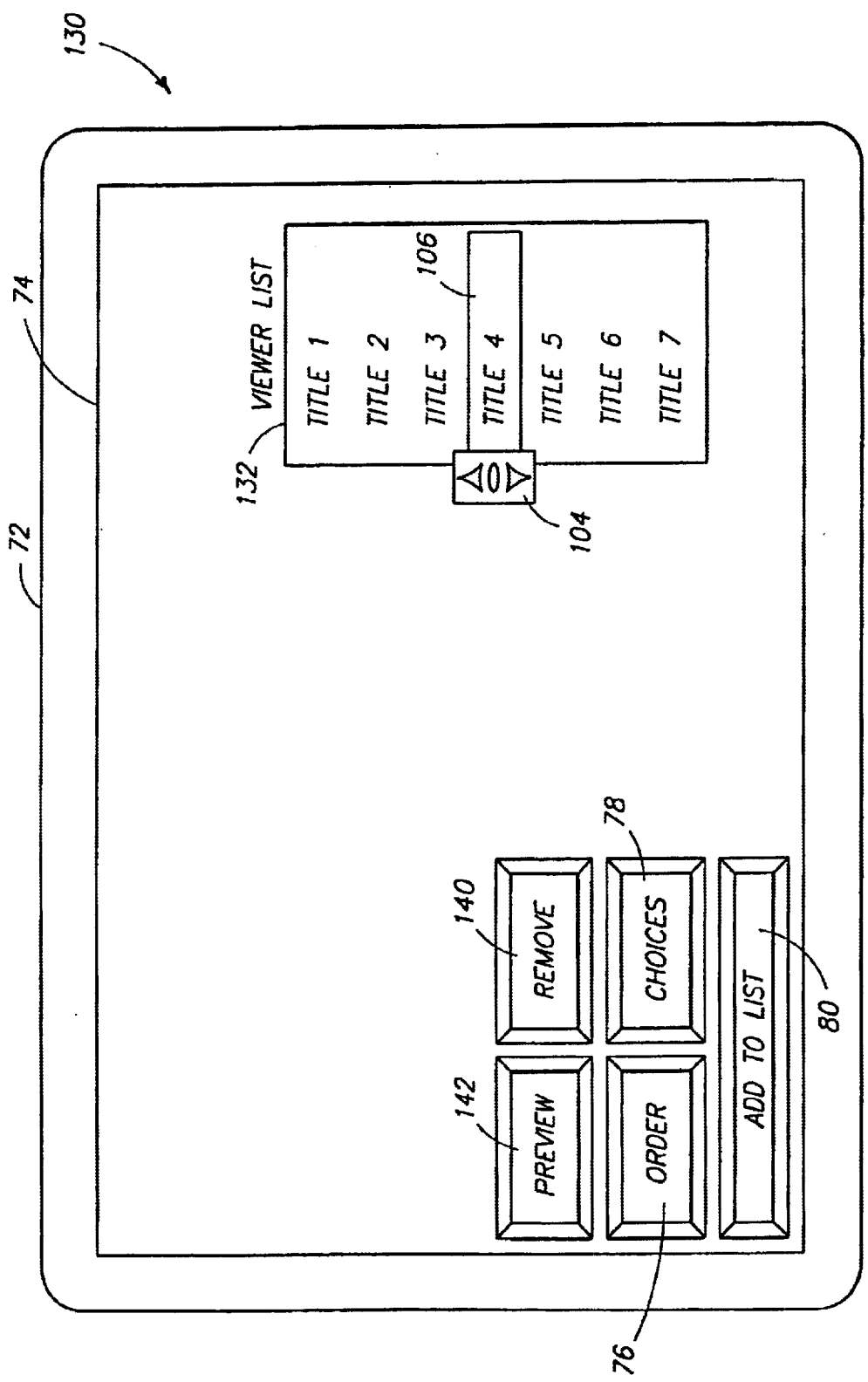

SYSTEM FOR PREVIEWING VIDEO TRAILERS

RELATED APPLICATIONS

This is a continuation of U.S. patent application Ser. No. 08/437,086, was filed May 5, 1995, which issued as U.S. Pat. No. 5,945,987 on Oct. 31, 1999.

TECHNICAL FIELD

This invention relates to interactive entertainment network systems, such as interactive television (ITV) systems, and to methods for operating such interactive entertainment network systems.

BACKGROUND OF THE INVENTION

Movie and television audiences are very familiar with previews, those one to three minute video clips that reveal highlights of upcoming shows. The preview clips, which are known as "trailers" in the film industry, are important promotional tools. They play on viewer emotions to entice viewers to see the program. The trailers are carefully crafted by the studios to present the most compelling sales pitch for watching a program. Given the importance of trailers, it is not uncommon for a studio to allocate a significant portion of the entire program budget to the production of a short trailer.

In the newer, interactive television (ITV) environment, it would be advantageous to provide trailers to attract potential viewers into renting a program over the interactive network. ITV systems have a single computerized control center, known as the "headend", which interactively communicates with multiple distributed television units located in subscriber homes. The headend provides traditional forms of programming, such as the familiar cable and broadcast programs, as well as newer forms of programming, such as video-on-demand. In the video-on-demand (VOD) mode of operation, a viewer can order video movies directly from his/her own television set. Indeed, in a full interactive entertainment network system like this invention, it is contemplated that a viewer will be able to order "on demand" movies, video games, television shows, and other video content programs from their home.

Video trailers would be particularly useful for the ITV video-on-demand mode to entice viewers into renting a movie, video game, or TV show. However, there is an unresolved issue with respect to how trailers can be conveniently supplied to selective viewer homes. Present designs of ITV systems anticipate having hundreds to thousands of movies, video games, and TV shows stored at the headend. The trailers for these programs will also be stored at the headend. One approach is to transmit the hundreds to thousands of trailers in sequential order, repeating the transmission each time the full repertoire is exhausted. But, this large volume of unrelated trailers is not very manageable or meaningful to the viewer, and thus, not useful from a practical or marketing standpoint. Viewers might become bored watching multiple trailers in which they have no interest and, as a result, switch out of the VOD mode to another channel.

Movie viewers, in particular, are accustomed to browsing for video movies in video rental stores. Such stores offer hundreds to thousands of videos, but have them grouped according to different categories. For instance, videos are often grouped by kind, such as new releases, oldies, westerns, foreign films, family films, and so forth. Other groupings might be by actor/actress name, alphabetical order of title, or topic. These groupings assist a shopper in locating a section of interest within which the shopper can limit his/her search for a suitable video movie.

It would be nice to provide the convenient organization afforded by a video store in the ITV video-on-demand environment. Unfortunately, unlike a video store which has an abundance of physical floor space to present many different. movies, the ITV system only has the limited space available on a TV screen to present the options. Accordingly, it is one object of this invention to provide an ITV system that organizes video movies according to different categories and provides a manageable set of video trailers about the movies.

Another problem is that once the set of video trailers is provided, the viewer would like to scan the trailers at their own pace, skipping the unappealing ones and perhaps replaying the good ones. In today's remote control TV world, viewers have become conditioned to quickly scanning television channels, one after another, often staying on a channel for only a few seconds. This practice is known as "channel surfing". It is another objective of this invention to enable a viewer to "surf" through the grouped video trailers at their own rate.

SUMMARY OF THE INVENTION

This invention provides an interactive entertainment network system with a video-on-demand (VOD) application that is like having a video store in your own home. Viewers are permitted to select criteria for grouping various video content programs (e.g., movies, games, TV shows, etc.) into manageable sets. Once grouped, preview video trailers for the set of programs are displayed. The VOD application permits the viewer to browse the trailers at their own rate, skipping forward to the next trailer or backward to the previous trailer. If the viewer settles on a particular program, the VOD application allows the user to rent the program immediately from the trailer being displayed on their television set, without returning to a menu or other order screen.

The interactive entertainment network system of this invention has a headend connected to multiple user interface units in individual homes via a distribution network, such as cable, RF, and/or satellite network. The headend provides full length video content programs and associated preview video trailers about the video content programs to the user interface units, which are commonly referred to as "set-top boxes" in the ITV arena.

The headend has a continuous media server database which stores the actual video data streams of both the full length video content programs and their associated preview video trailers. The video data streams are stored digitally as individual data files. Unique monikers are assigned to each program and trailer to locate them within the continuous media server database. The headend also has a program information database which maintains program data records pertaining to the video content programs. The program data records contain information about the programs, such as a program ID, title, moniker, cast members, director, rating, length of movie, brief description, and so on.

The program information database also contains information pertaining to Is each preview video trailer, such as its trailer ID and moniker. The program information database correlates the program IDs of the full length video content programs with the trailer IDs of the associated preview video trailers. In one implementation, this correlation is accomplished using a join table which interrelates the program and trailer IDs.

Each user interface unit has a processor and a video-on-demand (VOD) application which executes on that processor. The VOD application enables a user to select a group of programs from among all of the programs stored at the headend based upon a specified criteria, such as new releases, star name, title, customized viewer list, or any other definable criteria. The criteria is preferably presented as scrollable lists which the viewer can manipulate to select a certain criteria. In an example implementation, two lists can be presented simultaneously: a star list and a title list. The star list is first displayed, and upon selection of a star, a second list of movie titles in which the selected actor appears is displayed. The second list of movies provides an example manageable set of related video programs from which the viewer can choose.

Once a viewer actively selects a particular criteria, the user interface unit transmits a message containing that criteria to the headend over the distribution network. In response to the message, the headend searches the program information database using the criteria as a query to locate video content programs which meet the specified criteria. The search finds the program data records of the criteria-satisfying programs. The program IDs are extracted from the records and used to cross-reference via the join table to corresponding trailer IDs. The headend uses the trailer IDs to access other records which contain the trailer monikers of the preview video trailers for the video content programs that satisfy the viewer criteria.

As a result, the headend selectively groups a manageable set of preview video trailers for transmission to the requesting user interface unit. The headend transmits the program data records, including the program IDs and monikers and the trailer IDs and monikers. The headend also begins transmitting the set of preview video trailers in sequential order for display on the viewer's television set. The transmission of the trailers can be automatic, or in response to the viewer actuating a "preview" icon.

The user interface unit has a memory which queues the trailer monikers and IDs in an order that corresponds to the sequential order in which the associated preview video trailers are to be displayed. A preview browse user interface executes on the user interface unit as part of the VOD application to facilitate display of the preview video trailers.

The preview browse user interface has actuatable control icon buttons which enable a user to skip from a presently displayed preview video trailer to another preview video trailer. In one implementation, the preview browse user interface has next/previous control buttons which enable a user to skip from a presently displayed preview video trailer to a next or previous preview video trailer. Upon actuation, a processor resident at the user interface unit sends to the headend a trailer moniker that is next or previous to the trailer moniker of the presently displayed preview video trailer relative to their queue order within the unit's memory. The headend retrieves the next/previous trailer and begins transmitting it. To the viewer, this change appears nearly instantaneously, with little latency. The viewer therefore feels in control of the review rate, and is able to "surf" through the different previews.

The preview browse user interface also has an operable order icon overlaid on the displayed preview video trailer to enable the user to order the video content program that corresponds to the displayed preview video trailer. Upon ordering, the user interface unit sends a message containing the program moniker of the program associated with the displayed preview video trailer to the headend. The headend uses the program moniker to access the continuous media server database and retrieve the full length video content program. The headend transmits the full length video content program to the requesting user interface unit for display on the viewer's television set.

BRIEF DESCRIPTION OF THE DRAWINGS

FIG. 7 is a simplified example of database records and a join table used to correlate program and associated trailer IDs.

FIG. 8 is a simplified example of a data packet of program information that is sent from the headend to the STB.

FIG. 9 is another exemplary screen illustration of the preview browse user interface, which can appear subsequent to the FIG. 4 screen.

DETAILED DESCRIPTION OF THE PREFERRED EMBODIMENT

Figure 1:
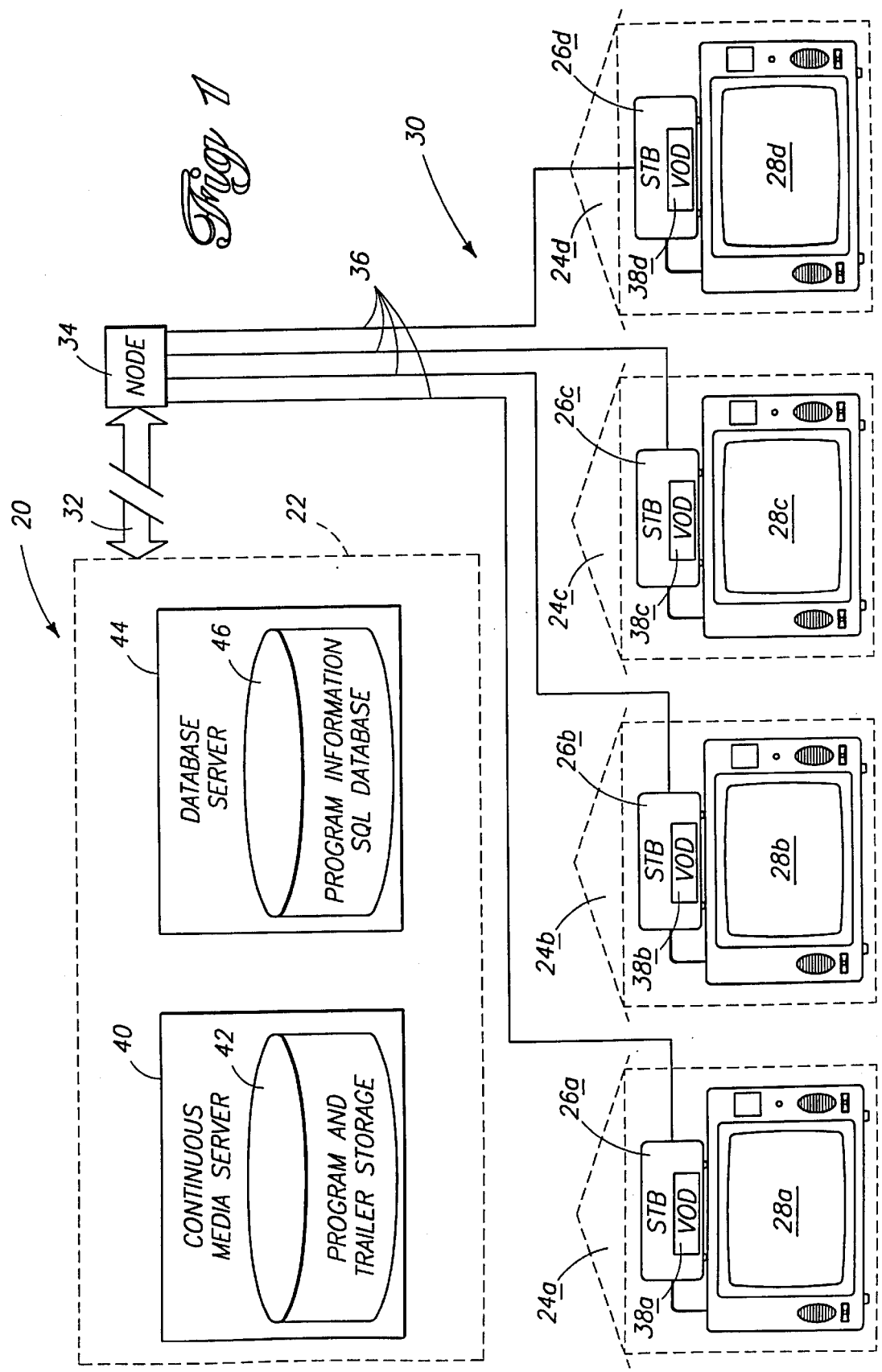
FIG. 1 is a block diagram of a interactive entertainment network system according to this invention.

FIG. 1 shows an interactive entertainment network system 20 in the form of an interactive television (ITV) system. System 20 includes a centralized headend or headend server 22 which is configured to provide video content programs to multiple subscriber homes. Representative homes 24a–24d are shown. The video content programs provided by headend 22 might include traditional broadcast TV shows, cable programs, on-demand movies, video games, and other services such as those commonly provided in the past by on-line computer services. A single headend might service 250,000 or more homes.

Each home has a user interface unit 26a–26d, commonly referred to as a set-top box (STB), coupled to a television set (TV) or video display device 28a–28d. The user interface units receive digital video signals from headend 22 and control which programs are displayed on the associated TVs. Instead of separate STBs, a user interface unit can be incorporated in the TV itself in other implementations.

Headend 22 is interconnected to the subscribers' homes 24a–24d via a multi-tier network or distribution structure 30. In the illustrated embodiment, distribution structure 30 includes a high-speed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a–26d via conventional home entry lines 36, such as twisted-pair lines or coaxial cable. As an example, each distribution node 34 supports approximately 1200 homes. As technology continues to improve, it is believed that parts of the distribution structure can be replaced with wireless forms of communication, such as RF communication or satellite communication.

Each user interface unit 26a–26d is configured to run a video-on-demand (VOD) application 38a–38d. VOD is like having a video store in your own home. Viewers are permitted to browse a wide selection of movies, video games, and TV shows, and rent the program they want to see immediately from their own TV sets. The VOD application is activated when a viewer switches to a designated VOD channel on the STB.

Headend 22 provides both video content programs and associated preview video trailers to the user interface unit within each home. The programs and trailers are transmitted as digital video data streams from headend 22 over distribution structure 30 to homes 24a–24d. Headend 22 includes a continuous media server 40 which has a program and trailer storage 42 to store the digital video data streams as independent files. Each data file represents a full length video content program—such as a feature-length movie, video game, or past TV show—or a preview of that movie, game, or show. Present designs of program and trailer storage 42 are expected to hold hundreds to thousands of full length programs and their trailers.

A potential viewer can select any one of these video data streams for viewing at any time. Unique monikers are assigned to each data file (i.e., each full length program and each trailer). The monikers are used to locate the corresponding data file within the continuous media server database at the headend. The continuous media server is preferably implemented as a disk array data storage system consisting of many large capacity storage disks, each on the order of one to several Gigabytes. The video data streams are stored digitally on the storage disks in predetermined or mapped locations. The locations of the video data streams are kept in a memory map and each video data stream can be accessed through pointers to the particular memory location.

The continuous media server can service simultaneous requests to view a program on demand (even the same program) from thousands of homes. The digitally stored video data streams can be accessed by any number of viewers at the same or staggered times. For example, one household might request a video data stream of a movie at 8:00 pm, and a second household might request the same video data stream of that movie at 8:02 pm. This situation is easily accommodated by slightly staggered pointers to the same video data stream beginning at the same memory location within program and trailer storage 40.

Headend 22 also has a database server 44 to store the programming information about each program and trailer. Database server 44 contains a structured query language (SQL) database 46 with program data records containing information relating to available movies, games, TV shows, or other programs. The SQL records reflect such things as the program title, cast members, director, rating, whether the program has closed captioning or stereo audio, length of program, scheduled time of the program, network name, program category, description text, and so forth. The program information is used by the VOD and other applications running on the STB (such as the electronic programming guide) to assist the viewer when previewing different programs.

The program data records stored in SQL database 46 also contain unique program IDs that are assigned to each full length video content program and unique trailer IDs that are assigned to each video trailer. The program and trailer IDs are used as a shorthand identification tag which can be used for rapid search of SQL database 46 and for establishing relational ties between a program and its associated trailer. This aspect is described in more detail below with respect to FIG. 7. The program data records further contain the monikers to locate the programs and trailers within the continuous media server storage 42. These monikers are short name descriptors that represent or call to indexing pointers to storage locations within storage 42 of continuous media server 40. The pointers identify storage locations of the video data streams of the programs and trailers that correspond to the information listed in the SQL database.

Figure 2:
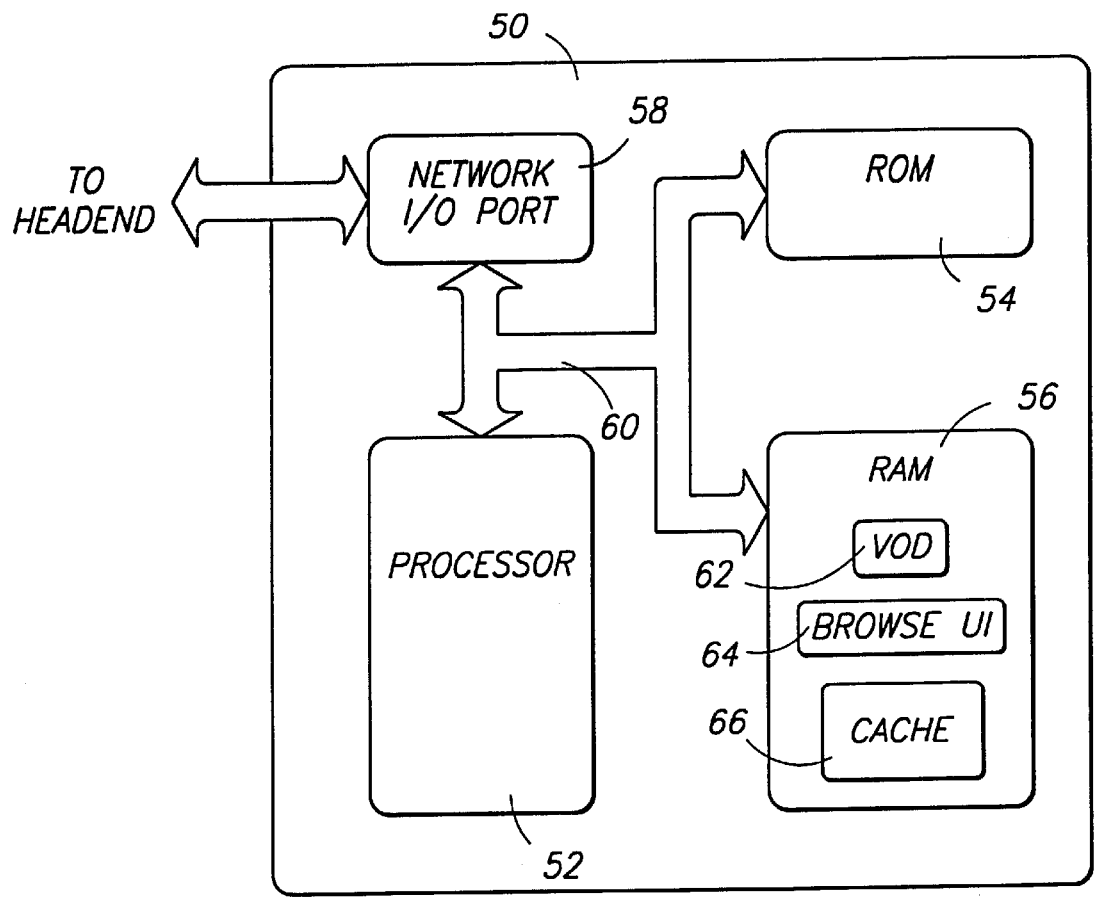
FIG. 2 is a block diagram of a user interface unit according to this invention.

FIG. 2 shows a user interface unit or set-top box 50 according to one implementation of the invention. STB 50 includes a programmable data processor 52, non-volatile memory (ROM) 54, volatile data/program memory (RAM) 56, and network I/O port 58. These components are interconnected via an internal multi-bit conductor or bus 60. Network I/O port 58 is responsive to data processor 52 for communicating with the headend to request and receive the program data records from SQL database 46. The network I/O port also receives the digital video data streams of the full length programs and short trailers from continuous media server 40. Network I/O port 58 is preferably a bi-directional transceiver incorporating analog-to-digital and digital-to-analog conversion circuitry.

A video-on-demand (VOD) application 62 runs on STB data processor 52 from data/program memory 56. VOD 62 is an executable program which is downloaded as an object or module from the headend in response to instructions by a viewer. As part of the VOD application, a preview browse user interface (UI) 64 is also configured to execute on data processor 52 from RAM 56. Preview browse UI 64 assists the viewer in navigating through portions of the video-on-demand application. The preview browse UI helps the viewer define a set of criteria used to group programs of interest, and then facilitates the display of preview video trailers on the TV which correspond to these programs. The UI further enables the viewer to "surf" through the various trailers at his/her own pace, and rent a program for immediate viewing.

VOD 62 also maintains a cache or memory 66 in the STB which temporarily stores the program data records received from the headend. Cache 66 is used to store the program IDs and monikers as well as the trailer IDs and monikers.

A viewer enters the VOD application by switching to the designated VOD channel on the set-top box, either by random channel surfing or by directly switching to that channel. When the STB tunes to the VOD channel, a continuous loop of "new releases" trailers are immediately displayed. These trailers are a predefined group of about 20–40 of the newest video programs that are presently available for rent. The trailers are displayed in a sequential fashion, one after another, to entice a viewer to stay on the VOD channel, watch more previews, and ultimately order a program.

Figure 3:
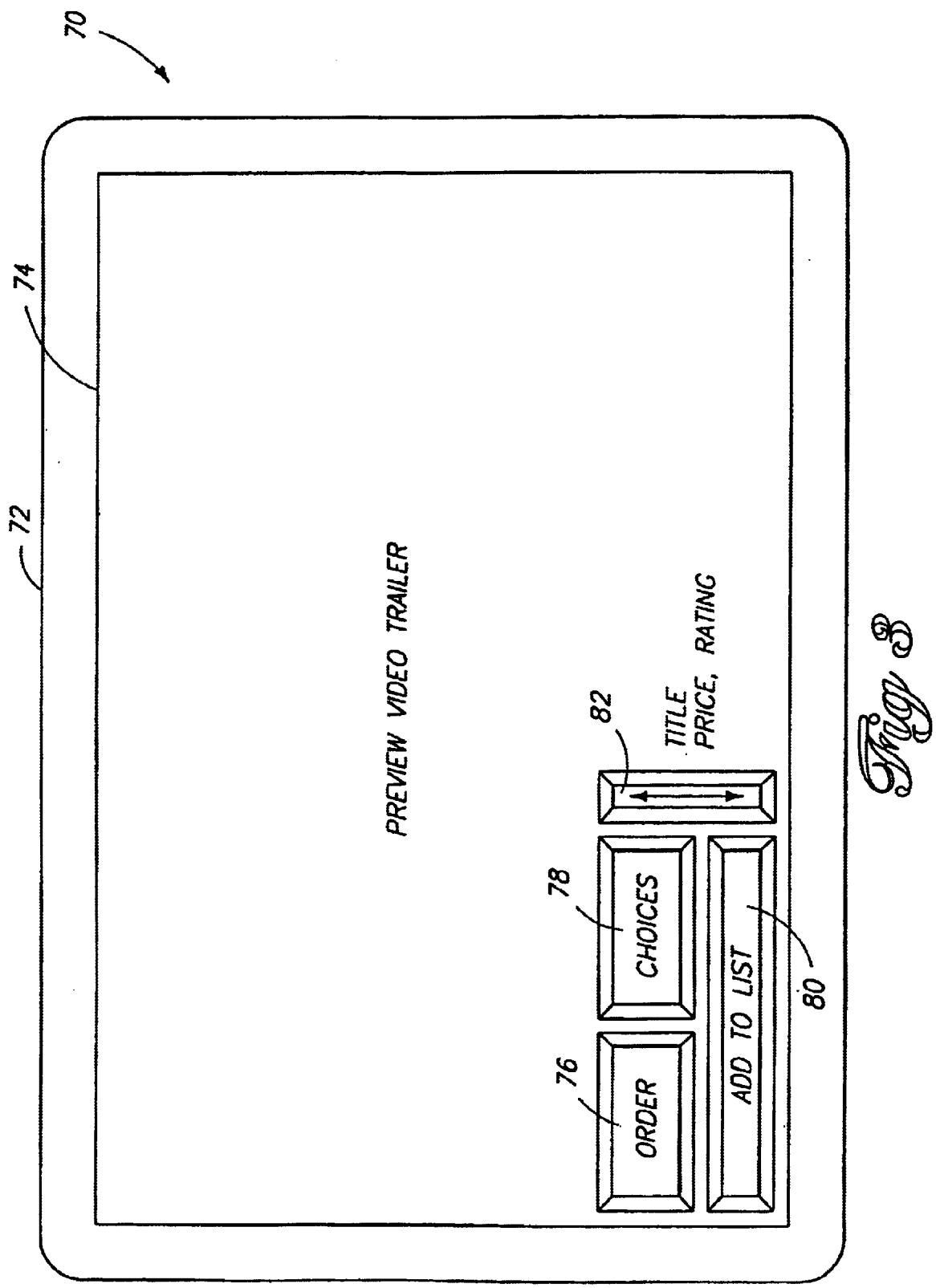
FIG. 3 is an exemplary screen illustration of a video-on-demand application, and particularly, of an initial screen in a preview browse user interface.

FIG. 3 shows an initial screen display 70 of the preview browse UI. In this graphic illustration, outer rectangle 72 represents the television screen. An inner rectangular area 74 represents the standardized NTSC video safe zone, which is the area of a TV screen that is presumed to be viewable on any set. The "new releases" trailers are played in area 72 in full-screen video, thereby ensuring that the filmmaker's art in crafting the preview will be given its maximum possible visual impact.

The preview browse UI has multiple actuatable graphical icons overlaid on the video trailers. In initial screen display 70, four icon buttons are present at the lower-left corner: an "order" button 76, a "choices" button 78, an "add to list" button 80, and an integrated "up/down" button 82. The buttons are 75 percent transparent and placed directly over the video trailer. The graphical icon buttons are arranged within video safe area 74.

The "order" button 76 enables the user to order a video content program that corresponds to the displayed preview video trailer. It initiates a financial transaction of renting the movie, video game, or TV show from the ITV service provider. The "choices" button 78 enables the viewer to choose different criteria for grouping programs into manageable sets for a more selective review. For instance, the criteria might be by star name, category type (e.g. new releases, westerns, oldies, foreign films), or kind (i.e., video games, movies, TV shows).

The "add to list" button 80 permits the viewer to create a customized list of personal favorites that he/she might wish to watch some day. As the viewer browses the trailers, the viewer can simply click the "add to list" button 80 and the program ID of the video content program associated with the presently displayed trailer is added to the customized viewer list. The list is kept at the headend in the program information database.

The "up/down" button 82 enables the viewer to skip through the preview video trailers, forwards and backwards, in the same manner that the viewer is accustomed to channel surfing through traditional cable channels. This allows the viewer to control the pace at which he/she wishes to watch the previews, skipping over uninteresting ones or replaying previews of interest.

A focus frame, or the like, can be used to highlight the operable button. To enhance intuitive visual feedback to the viewer, the program browse UI provides a graphical change to indicate when an icon button is depressed. This provides a visual and auditory feedback which the user associates with the manual actuation and tactile sensation of depressing a physical control button on the STB or remote control handset. This feedback is helpful in the interactive environment because the viewer might experience a slight delay, albeit very short, between the time he/she depresses the physical control button and the time the appropriate response to the control is depicted on the TV. By graphically changing the icon, the viewer is visually informed that his/her command has been received and is in the process of being completed.

A space adjacent to the icon buttons is reserved for displaying textual information pertaining to the program preview that is being shown. This information includes the title, rental price, and rating, although any other program related information can also be displayed (e.g., cast names, close caption, brief description, director, etc.). This information is included in the program data records.

Upon entering the VOD application, the new releases trailers are displayed. If the viewer does nothing, the previews of the new releases cycle through, over and over. The viewer can immediately order a program from this initial screen 70 using "order" button 76; add the program to their customized list using the "add to list" button 80; skip through the previews using "up/down" button 82; or pop up other search criteria using "choices" button 78 to select a new criteria for grouping programs.

Figure 4:
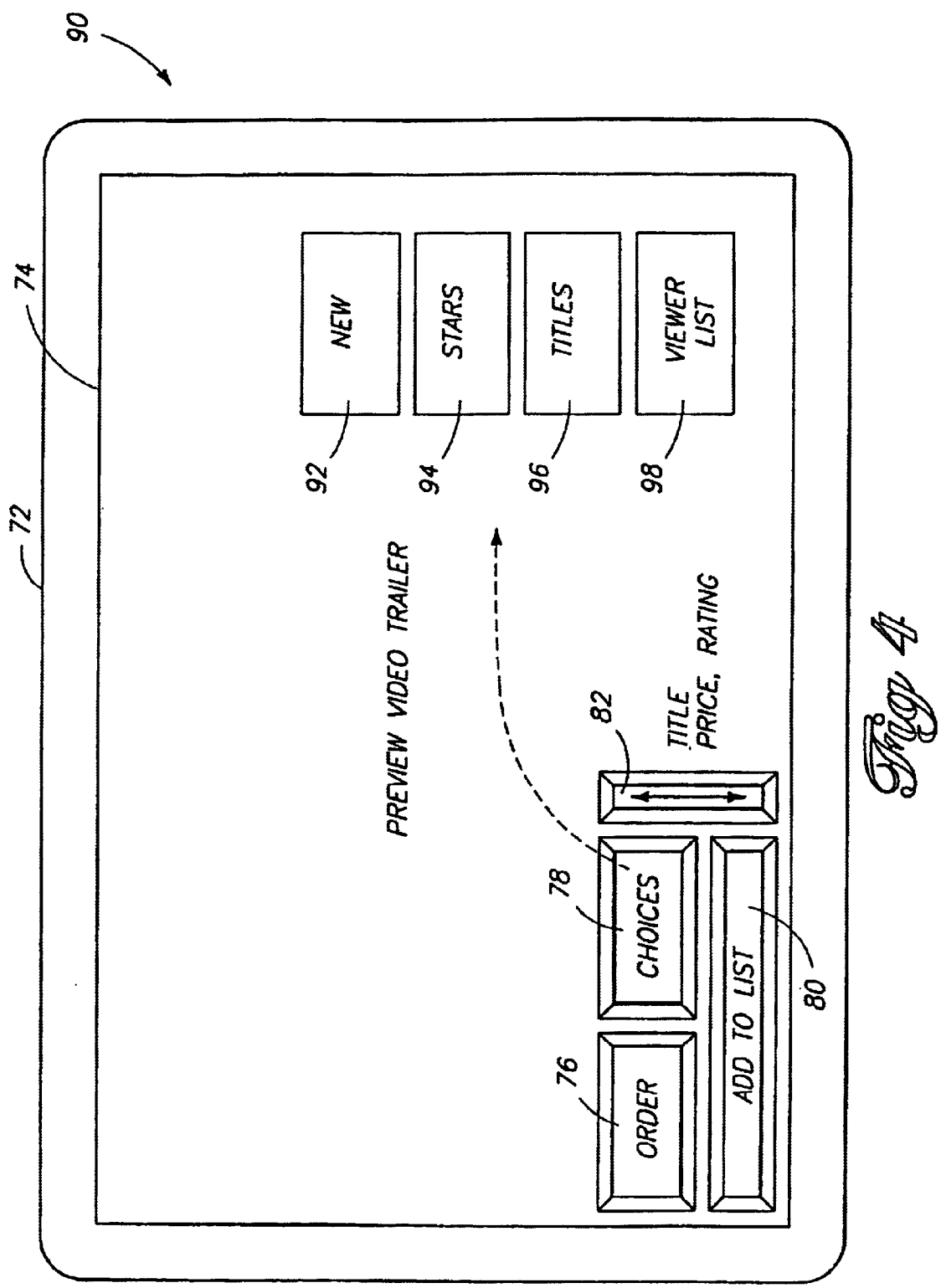
FIG. 4 is another exemplary screen illustration of the preview browse user interface, appearing subsequent to the FIG. 3 screen.

FIG. 4 shows a screen display 90 that is depicted when a viewer selects the "choices" button 78 to pull up possible search criteria for different sets of programs. For discussion purposes, an example four criteria selection icon buttons pop up (as represented by the dashed arrow, which is not shown on the screen): a "new" button 92 which activates a list of programs that are newly released, a "stars" button 94 which activates a list of stars, a "titles" button 96 which pulls up a list of program titles, and a "viewer list" button 98 which presents the personal customized list of programs. These four icon buttons are overlaid on the displayed video trailers.

Figure 5:
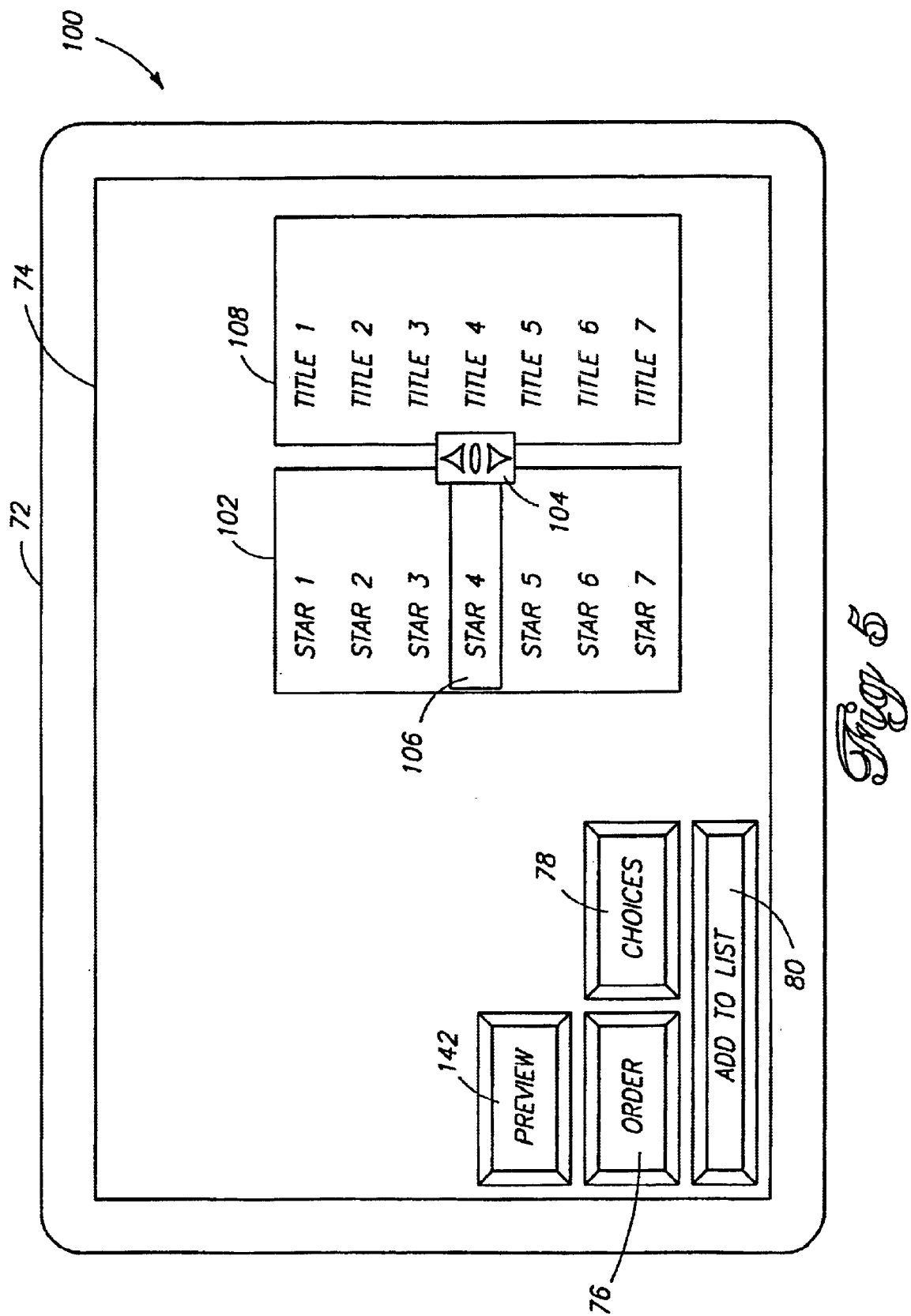
FIG. 5 is yet another exemplary screen illustration of the preview browse user interface, which can appear subsequent to the FIG. 4 screen.

FIG. 5 shows a screen display 100 following selection of one of the criteria selection buttons 92–98 from screen display 90 (FIG. 4). In this example screen display, the viewer has selected the "stars" button 94 (FIG. 4) to bring up a list of stars 102. In response to this actuation, the STB processor sends a message to the headend to retrieve a list of stars from the program information database. The list of stars is downloaded to the STB memory. A portion of the entire stars list held in the STB memory is presented as a scrollable list 102. A graphical up/down arrow 104 indicates that the list can be bi-directionally scrolled upwards or downwards.

In this implementation, the list scrolls while a focus bracket 106 remains stationary. When the viewer manipulates up/down arrow 104 in the up direction, the star names shift downward within box 102 so that one displayed entry (e.g., "star 7") is removed as a new entry is added (i.e., an entry is added above the "star 1" entry). This yields an appearance of visually scrolling the focus bracket upward over the next upper name (i.e., "star 3"). Conversely, when the viewer manipulates the up/down arrow 104 in the down direction, the list scrolls upward to present a visual appearance of moving the focus bracket 106 down the list.

The stars list (or any other) can be scrolled at a selected rate which can be adjusted by the viewer to meet their personal reading preference. The user interface unit offers an on-screen menu (not shown) which permits the user to adjust the scroll rate. The user interface unit keeps the selected scroll rate in the programmable STB memory and uses it to scroll any on-screen list at the preferred speed.

Upon selection of a particular star name (e.g., "star 4"), the user interface user sends the star ID to the headend to use as a query for searching the program information SQL database. The database returns a list of movies in which the selected star has performed. That is, these movies satisfy the criteria specified by the viewer, which in this case, is the name of star 4.

Figure 6:
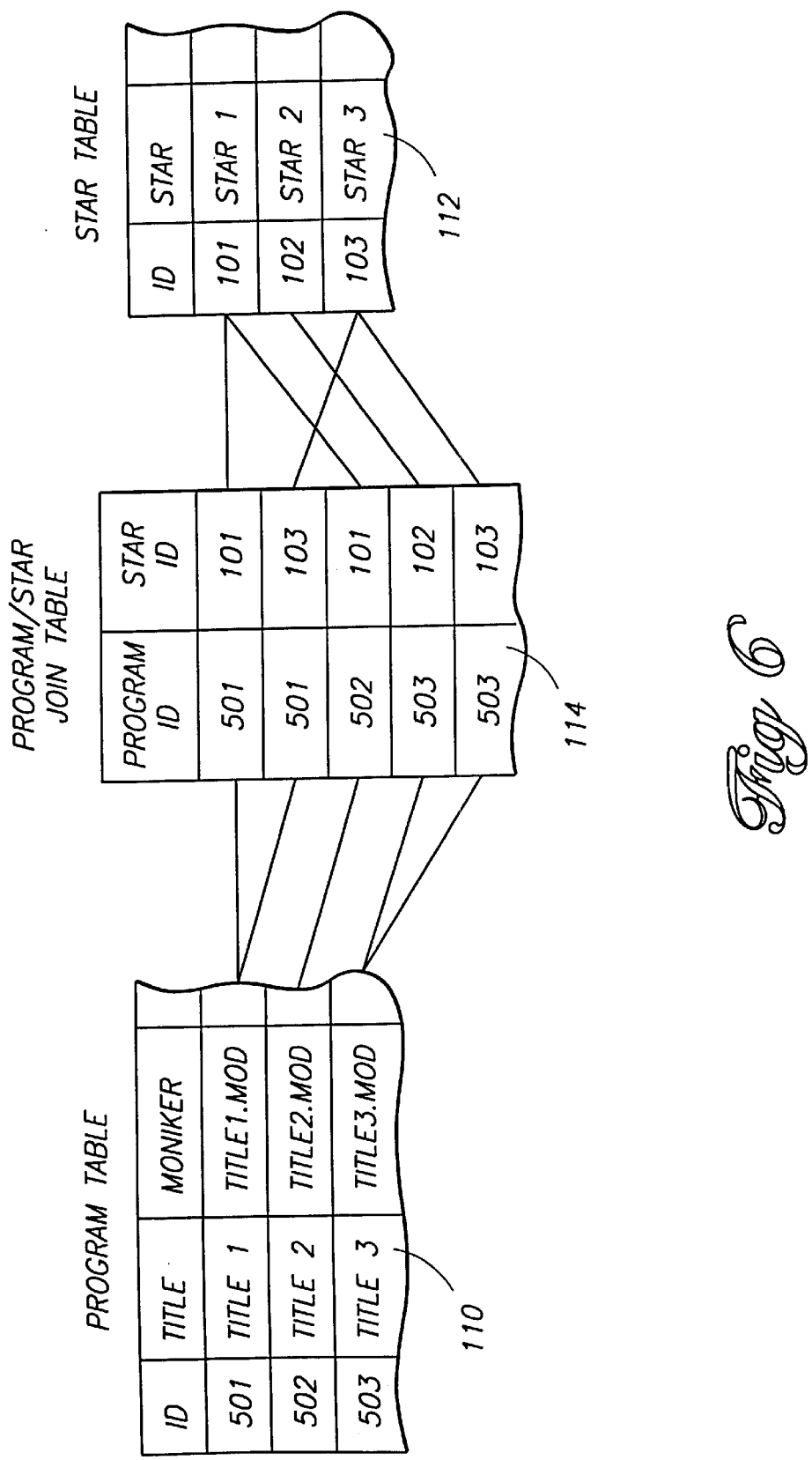
FIG. 6 is a simplified example of database records and a join table used to correlate program and star IDs.

FIG. 6 shows one implementation of the headend program information database for correlating the stars with the programs using a join table. The database has a program table 110 which stores the records pertaining to the programs. Table 110 contains a program ID, title, moniker, as well as other information. A star table 112 is also maintained in the SQL database. It contains star IDs, star names, and other information pertaining to the star. A join table 114 relates the program IDs from program table 110 with the star IDs from star table 112. A join table offers a many-to-many relationship between items listed in different tables. For example, the same star may appear in many different movies, and each movie typically features a different cast of many stars. Each item is stored in one place within the database, and redundancy is limited to the join tables. In the illustrated example, star 1 appears in programs "title 1" and "title 3", and thus, the star's ID 101 is tied to the program IDs 501 and 503 in join table 114. When the headend receives a star ID from the user interface unit, the join table is easily and quickly searched to find all program IDs that correlate to the star ID.

The full program records of the tagged program IDs are then retrieved from the SQL database. The headend also retrieves the monikers and IDs of the trailers associated with the identified programs from the SQL database. The programs are correlated with corresponding trailers within the database to simplify the task of cross-referencing the programs and trailers.

FIG. 7 shows one implementation for correlating the full length video content programs with their associated preview video trailers. The SQL database maintains a trailer table 116 which contains a list of information pertaining to trailers, including the ID, name, and moniker. A join table 118 correlates the IDs of the full length programs with the IDs of their associated preview clips. Accordingly, the SQL database can be queried using the program ID to return the related trailer ID of the associated preview clip. Once the trailer ID is determined, the other information about the trailer, such as its moniker, can be quickly accessed.

To continue the above example, the headend queries program/star join table 114 using the star ID to retrieve programming information about a set of programs in which star 4 appeared. The headend also retrieves information pertaining to a set of trailers for those programs, using the program IDs to index the program/trailer join table 118. The headend transmits the programming information back to the user interface unit over the distribution network.

FIG. 8 shows an example data packet 120 transmitted from the headend to the STB. Data packet 120 contains program titles, runtime length of the programs, program IDs, program monikers, trailer IDs, and trailer monikers. This packet is received and deciphered by the STB processor and the information contained therein is stored in the RAM.

With reference again to FIG. 5, the preview browse UI presents all or a portion of the list of programs in a second scrollable list 108. Here, seven program titles are displayed, all of which have star 4 appearing in them. The titles themselves might be listed in alphabetical or chronological order. This program list therefore contains a manageable set of programs (e.g., 1–20 programs) that can be conveniently reviewed by the user. To further assist the viewer, a label such as "Star 4 Movies" can be displayed on the screen to give the viewer some notion of the selected movie grouping. As the viewer chooses new criteria, causing different groupings of programs to be downloaded from the headend, the description label is updated to help identify the context of the current grouping of programs.

The above example employed a star name as a selection criteria. However, other criteria can be used to group different sets of programs for the viewer. For example, FIG. 9 shows a screen display 130 which is depicted upon selection of the "viewer list" button 98 (FIG. 4). Screen display 130 presents a scrollable list 132 which contains the personal customized list of programs that is created by the viewer. This list is generated by sending a viewer ID to the headend as a query for the SQL database.

Figure 10:
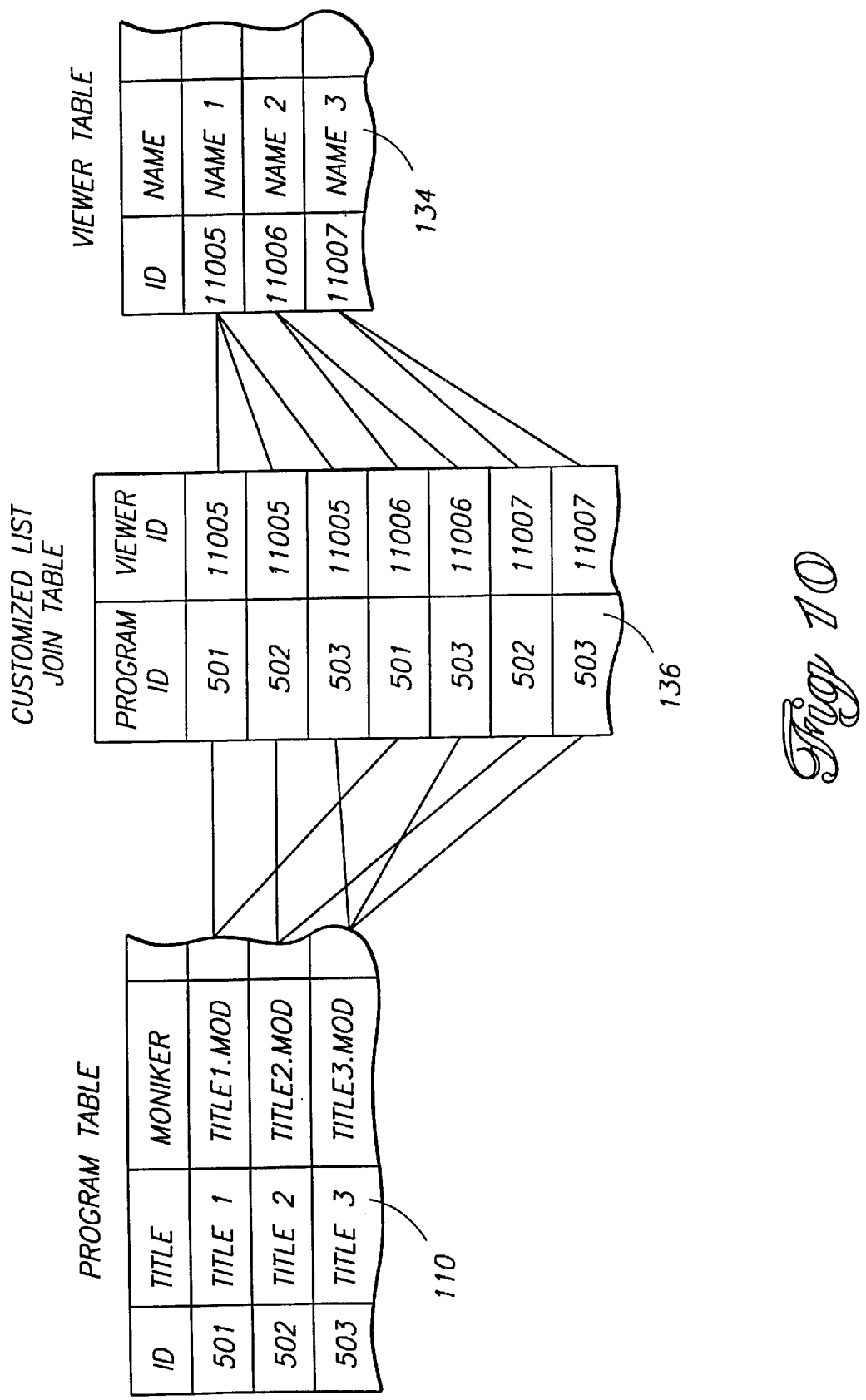
FIG. 10 is a simplified example of database records and a join table used to correlate viewer and program IDs.

FIG. 10 shows an implementation for correlating the viewer IDs with the program IDs of the video content programs at the headend to help respond to a query for the viewer's own customized list. The SQL database at the headend maintains a viewer table 134 which contains a list of viewers and their associated unique IDs. A join table 136 correlates the program IDs from program table 110 and the viewer IDs from viewer table 134. The SQL database therefore maintains a customized list of programs for each viewer. Upon receipt of the viewer ID from the STB, the database returns information of the video content programs that are correlated with the viewer ID. The headend transmits a data packet of programming information (similar to packet 120 is FIG. 8), including the program IDs and monikers and the trailer IDs and monikers. It is noted that this list, as well as others, might already have been downloaded to the STB as part of initialization procedures when activating the video-on-demand application.

The programming information is used by the STB to form viewer list 132 in FIG. 9. As described above, the customized viewer list 132 can be scrolled upwards and downwards at a selectable rate to see all of the titles contained in the list. Up/down arrow icon 104 and focus bracket 106 are provided to aid in this process.

Notice that screen display 130 in FIG. 9 includes a "remove" icon button 140 which can be actuated to delete the highlighted program title from the list. Upon actuation of button 140, the user interface unit signals the headend to remove the association in the join table 136 between the viewer ID and the program ID of the removed program.

Alternatively, the viewer can add programs to the list by actuating the "add to list" icon button 80, whereby the user interface unit informs the headend to associate the program ID of the added program with the viewer ID in join table 136. This feature enables the viewer to interactively assemble his/her own list 132 of preferred programs, adding titles to it and removing titles from it. Personalizing the program listings lends a sense that the viewer is in control of the technology, and should not be intimidated by it. The "add to list" icon button 80 is available on all of the screen displays for the user's convenience and to further enhance the degree of interactivity of the system.

With reference to FIGS. 5 and 9, the preview browse UI has a "preview" icon button 142 which can be actuated to preview the group of programs contained in the displayed list. In the FIG. 5 screen display, for example, actuating "preview" button 142 initiates a series of video trailers for those programs listed in title list 108. In the FIG. 9 screen display, a series of video trailers for the programs listed in viewer list 132 are displayed upon actuation of the preview button 142. The new series of trailers replaces the default "new releases" trailers.

Upon election of the "preview" button, the user interface unit sends the moniker of one of the preview trailers to the headend along with a request to begin transmitting the corresponding video stream. Alternatively, the user interface unit might send a begin transmission signal, with the headend already knowing which set of clips to transmit. The headend transmits the video previews in sequential order according to the order shown on the displayed list. Preferably, the monikers and IDs of the trailers and associated programs are queued in the STB memory in a queue order that corresponds to the sequential order in which the associated preview trailers are transmitted.

The preview browse UI returns to screen display 70 of FIG. 3 to permit full-screen viewing of the preview clips on the list as the are played on the television set. In addition to calling up the highlighted program from the list, another benefit of the "preview" button is that it readies the other trailers in the program grouping. As a result, a viewer might select a particular movie in which star 4 appeared, and receive the preview of that movie. However, without returning to the list, the previews to related movies with star 4 are made available for review. This is very convenient for the viewer.

If left alone, the trailers for the selected list (e.g., the viewer's customized list) will run in a continuous loop, one after another. The viewer can leisurely watch the short set of trailers for the listed programs without interrupting them. Alternatively, the viewer can optionally skip over previews of uninteresting programs or repeat previews of attractive programs.

In the illustrated implementation, "up/down" control button 82 (FIG. 3) operates as "next/previous" buttons which enable the viewer to skip from a presently displayed trailer to a next or previous trailer. When activated, the user interface unit sends the next or previous moniker in the queue order back to the headend. The moniker is used to access the continuous media server storage to retrieve the next or previous trailer. The headend then ceases sending the present trailer and begins transmitting the retrieved next/previous trailer so that the transition appears almost instantaneous to the viewer. This interactive feature allows the viewer to surf through the video clips at their own pace.

The "next/previous" operation directly corresponds to the "up/down" operation of traversing a list. Flipping backward through previous trailers is essentially the same as moving up through the list and skipping forward to next trailers is like moving down through the list, even though the list is not actually displayed. When the viewer reaches the end of a set of previews, the previews loop back to the beginning of the list in a continuous manner.

The preview browse UI allows the viewer to order the full length program directly from the preview browse UI, without reverting to a blank order menu or the like. Suppose the viewer wishes to rent the program that is presently being previewed. The viewer simply actuates the overlaid "order" button 76 in any one of the screens of the preview browse UI. This causes the STB to send a message with the program moniker that corresponds to the trailer being depicted. The program moniker is used by the continuous media server database to retrieve the full length video content program. The headend then transmits the full length video content program over the distribution network to the STB that ordered the program.

In other implementations, the STB might transmit the program ID to the headend. The program ID can be related to the appropriate program moniker via program table 110 in SQL database. Yet another alternative is to have the STB send the trailer ID to the headend. The trailer ID can be cross-referenced to the program ID via join table 118, which is then related to the appropriate program moniker via program table 110.

Figure 11:
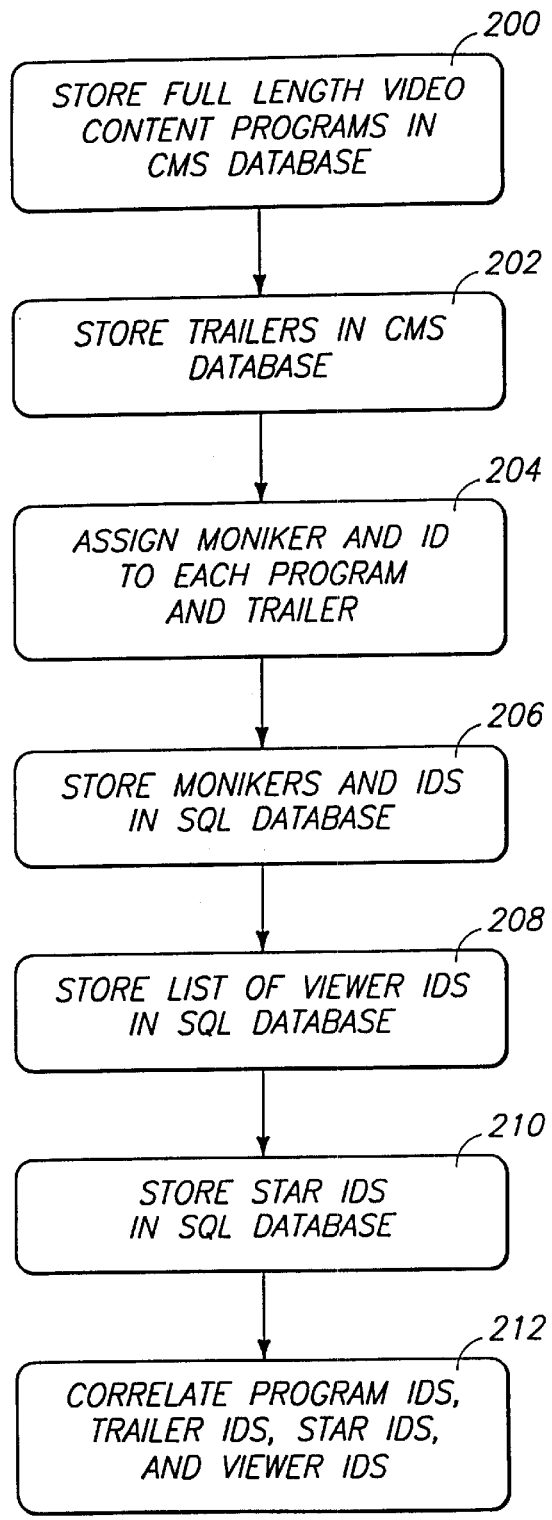
FIG. 11 is a flow diagram of steps for initializing an interactive entertainment network system for preferred operation.

FIGS. 11–14 show a method for operating an interactive entertainment network system of this invention. FIG. 11 shows the initialization steps for implementing an interactive system. At steps 200 and 202, the full length video content programs and preview video trailers are stored in the continuous media server (CMS) database as independent digital data files. A unique moniker and ID is assigned to each full length program and to each trailer (step 204). These monikers and IDs are stored in the SQL database at the headend (step 206). A list of viewers and their IDs is also maintained in the SQL database (step 208). In fact, the SQL database maintains all of the programming information pertaining to the programs, such as cast members, director, runtime length, rating, and so on, as represented by step 210 of storing the star IDs in the this database.

Once the program parameters are stored, they can be correlated with one another to promote an efficient operation (step 212). Namely, the program IDs and star IDs are correlated in join table 114 (FIG. 6); the program IDs and trailer IDs are correlated in join table 118 (FIG. 7); and the viewer IDs and program IDs are correlated in join table 136 (FIG. 10).

Figure 12:
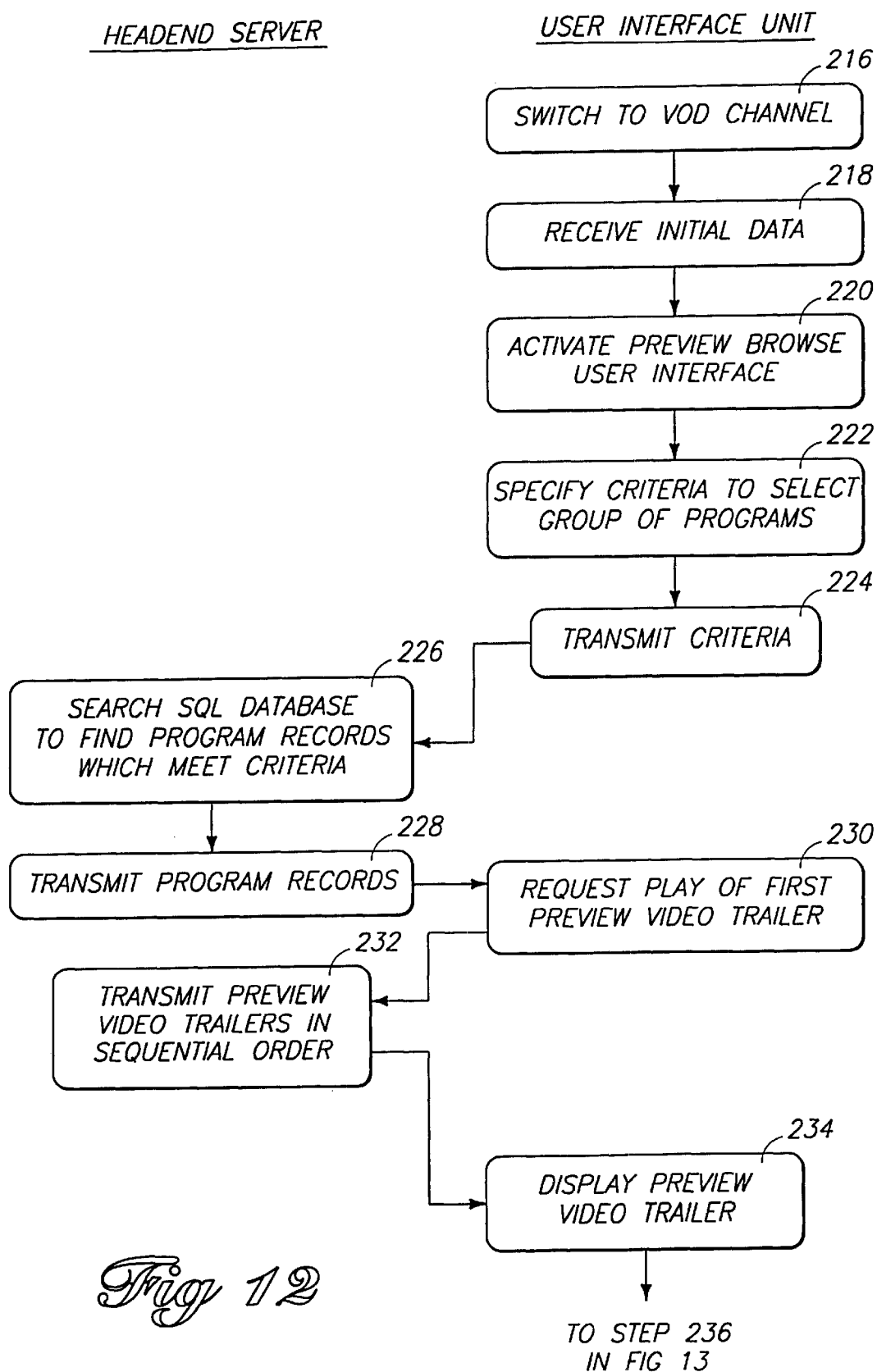
FIGS. 12–14 present a flow diagram of steps for operating an interactive entertainment network system according to this invention.
Figure 13:
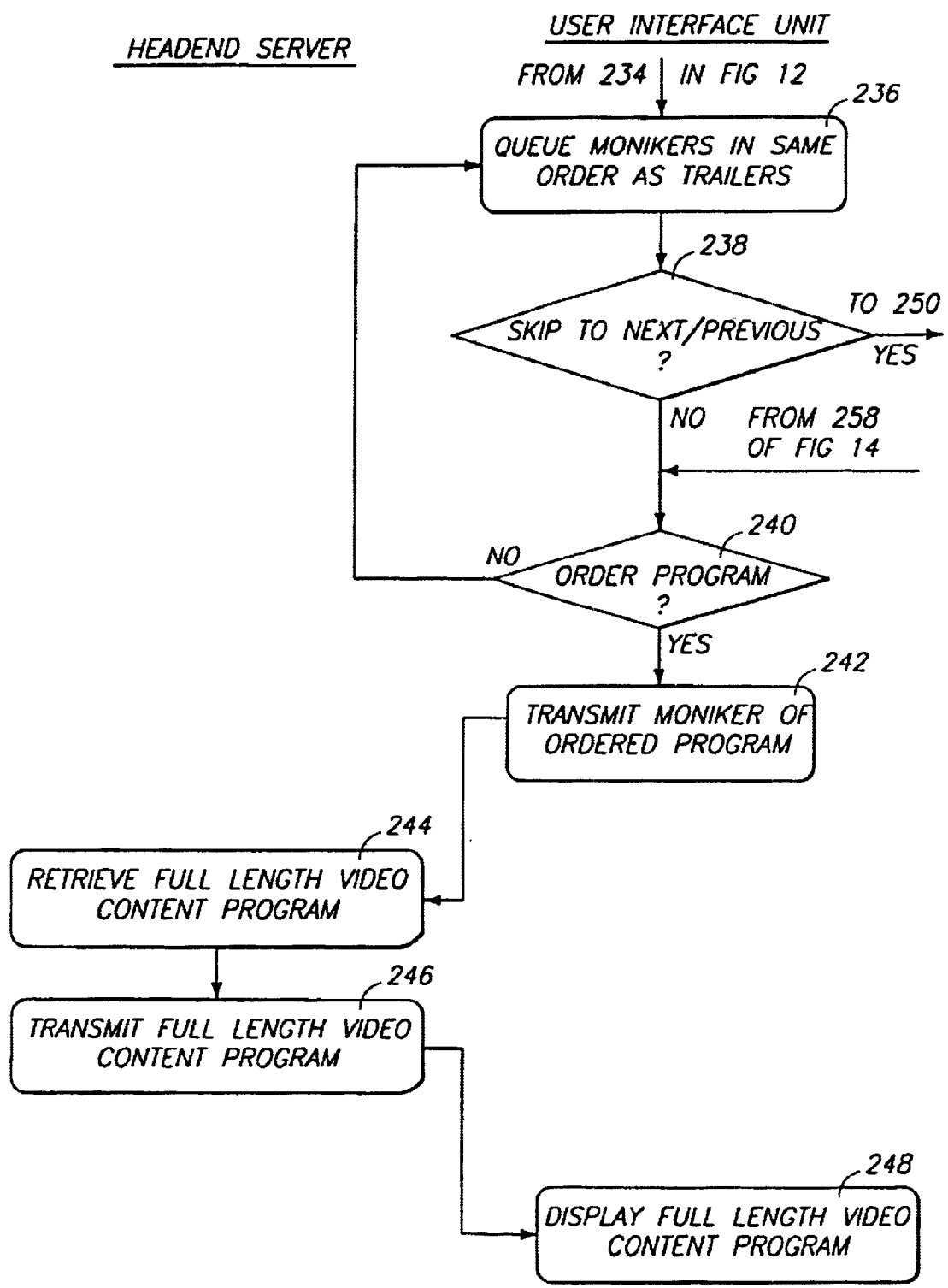
Figure 14:
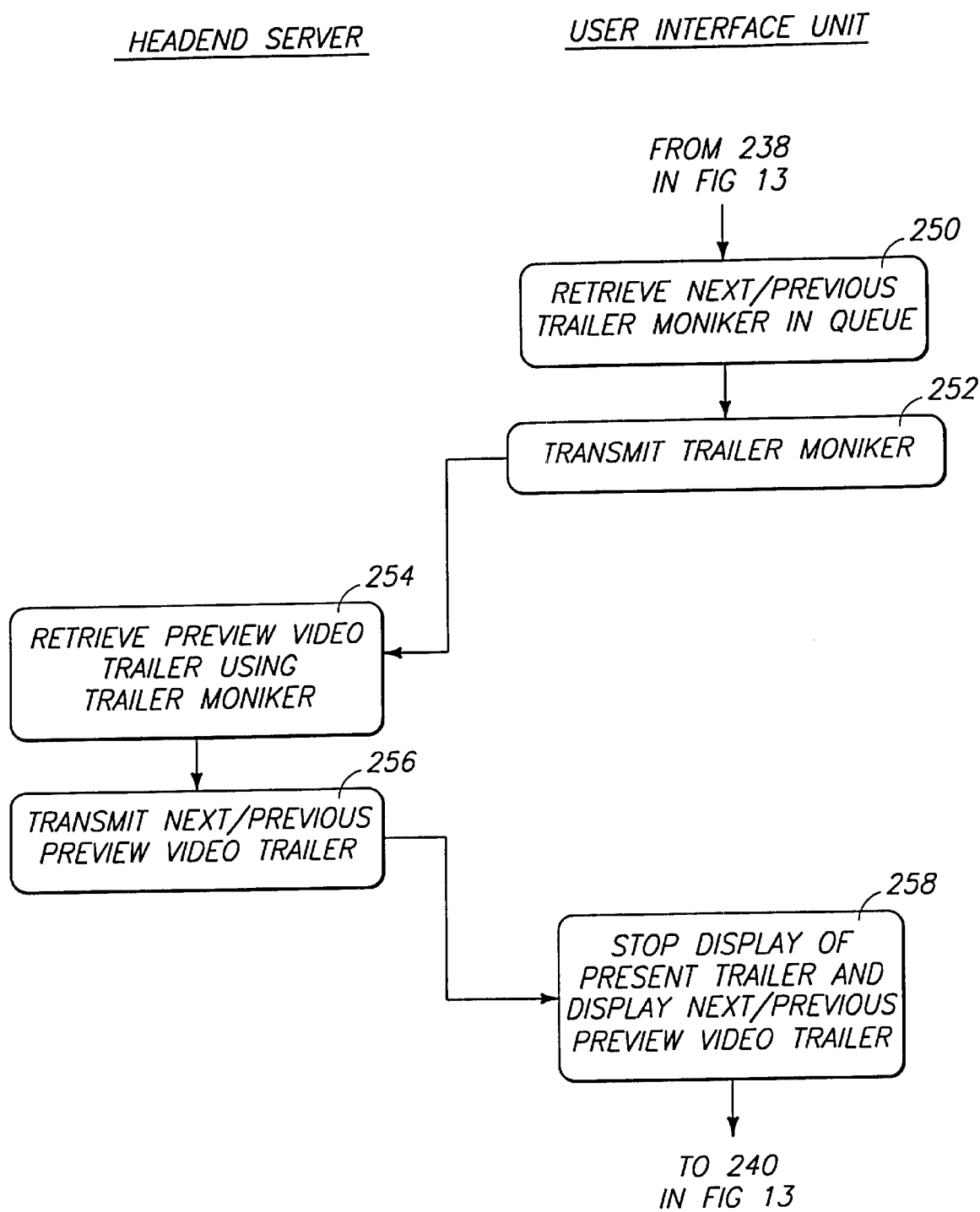

FIGS. 12–14 show a method for operating the interactive system in the VOD mode. To promote clarity, the flow diagram illustrates exemplary steps as though they are performed at either the headend server or user interface unit. Beginning with step 216 in FIG. 12, the viewer activates the VOD application by switching the STB to the designated VOD channel. Initial data is received by the STB from the headend (step 218). Such data might include category lists, star lists, new releases lists, or other information that is useful in the startup phase. At step 220, the VOD application initiates the preview browse user interface and the initial screen display 70 (FIG. 3) is depicted.

The default set of "new releases" trailers are shown. If the viewer remains passive, the "new releases" trailers will run in a continuous loop, one after another. If the viewer wishes to select a new group of programs, the viewer can actuate the "choices" button 78 to pull up various lists of criteria (e.g., star name, title, viewer list, etc.). From the one or more lists, the viewer actively specifies a criteria to select a group of programs (step 222). The criteria is transmitted from the STB to the headend (step 224).

At the headend, a search of the SQL database is conducted to locate program records which meet the search criteria (step 226). For example, if the search criteria is the viewer's own list, the SQL database will use the viewer ID to reference all associated programs that exist in the customized list join table 136 (FIG. 10). At step 228, the set of program records that meet the criteria are sent back to the requesting STB in the form of data packet 120 (FIG. 8). This packet includes the program monikers and IDs, and the trailer monikers and IDs.

At step 230, the viewer actuates the "preview" icon button 142 (FIGS. 5 and 9) to request play of the first preview video trailer in the program set. This request is sent to headend, which begins transmitting the preview of the first trailer in the group in response (step 232).

Back at the STB, the previews of the requested set of programs are displayed on the TV set (step 234 in FIG. 12) and the program and trailer monikers are queued in the same order that the trailers are played (step 236 in FIG. 13). As described above, the viewer can watch the trailers as they are presented, or skip through them at the viewer's own pace.

At step 238, it is determined whether the viewer has skipped to a next or previous trailer. If so (i.e., the "yes" branch from step 238), flow continues in FIG. 14 with step 250 of retrieving the next/previous moniker in the queue. This moniker is transmitted to the headend (step 252) and used to retrieve the appropriate trailer video stream from the CMS database (step 254). The next/previous trailer is then transmitted back to the STB (step 256). In this manner, the STB stops playing the existing trailer and begins playing the next/previous trailer on the TV (step 258). This process gives the viewer control to surf through the clips. Additionally, there is no screen dead time between trailers as the next/preview trailer begins upon cessation of the present trailer.

Returning to FIG. 13, flow continues at step 240 (either directly from step 238 or from step 258 in FIG. 14) to determine whether the viewer has ordered any program. If not (i.e., the "no" branch from step 240), the trailers continue to cycle. Once the viewer settles on a particular program and orders it (i.e., the "yes" branch from step 240), the STB transmits the program moniker to the headend (step 242). The CMS database is accessed using the moniker to retrieve the full length video content program (step 244), which is then transmitted back to the STB (step 246). The rented program is then displayed on the TV set (step 248). The viewer's account for renting the program is charged the appropriate amount.

The means for performing the steps of this method are described above with reference to FIGS. 1–10.

The interactive entertainment network system of this invention provides short, organized sets of previews that are manageable and convenient for review. The system filters the entire database of programs into small groups of similar programs based on intuitive criteria. This is advantageous over a system that always presents the same overwhelming list of all available programs on the database to the user each time he/she enters the VOD mode.

Another benefit of this invention is the freedom afforded the viewer to surf through the group of previews at his/her own pace. This enhances the interactivity of the system, and encourages participation from the viewer. Still another benefit is the ability to order the full length program directly from the preview, as opposed to a stark order menu. This attribute is user friendly and creates an intuitive interface for the viewer.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. In an interactive entertainment network system in which a content provider serves video content programs and associated preview video trailers to a user interface unit over a distribution network, a system comprising:

a memory at the user interface unit;

an application resident at the user interface unit to search an SQL database that includes program IDs for full length video programs, trailer IDs for preview video trailers and associated preview video trailer monikers, viewer IDs for viewers, star IDs for stars wherein a first join table correlates program IDs and star IDs, a second join table correlates program IDs and trailer IDs, a third join table correlates program IDs and viewer IDs, and a viewer table associates viewer IDs and viewers and wherein the program IDs and the trailer IDs are usable as shorthand ID tags for rapid search of the SQL database, to receive trailer monikers from the SQL database, and to queue the trailer monikers in a sequential order in the user interface unit memory;

a preview browse user interface which executes at the user interface unit to facilitate display of the preview video trailers in the sequential order, the preview video trailers retrieved from storage locations in a video media database, the storage locations associated with the trailer monikers; and the preview browse user interface having next/previous control icon buttons which enable a user to skip directly from a presently displayed preview video trailer to a next or previous preview video trailer in the sequential order.

2. A system as recited in claim 1 wherein the preview browse user interface has an operable order icon to enable the user to order the video content program that corresponds to the displayed preview video trailer and the system to associate the ordered program with the user, and a rental price.

3. A system as recited in claim 1 wherein the preview browse user interface presents at least one list of criteria that can be used by a user to select a group of preview video trailers for display.

4. A system as recited in claim 1 wherein the preview browse user interface presents a first list of criteria from which a user can select a criteria, and upon selection of the criteria, the preview browse interface presents a second list of video content programs that meet that selected criteria from the first list.

5. A user interface unit comprising:

a processor;

a network I/O configured to receive preview video trailers from a continuous media server and to receive information associated with preview video trailers from an SQL database server that includes program IDs for full length video programs, trailer IDs for preview video trailers, viewer IDs for viewers, star IDs for stars wherein a first join table correlates program IDs and star IDs, a second join table correlates program IDs and trailer IDs, a third join table correlates program IDs and viewer IDs, and a viewer table associates viewer IDs and viewers and wherein the program IDs and the trailer IDs are usable as shorthand ID tags for rapid search of the SQL database;

a memory to store the information associated with the preview video trailers;

a preview browse user interface which executes on the processor to facilitate display of preview video trailers in a sequential order; and the preview browse user interface having actuatable next/previous control buttons which enable a user to skip directly from a presently displayed preview video trailer to a next or previous preview video trailer.

6. A user interface unit as recited in claim 5 wherein the information associated with the displayed preview video trailer includes a moniker associated with the video content program.

7. A user interface unit as recited in claim 5 wherein the preview browse user interface presents at least one list of criteria that can be used by a user to select a group of preview video trailers for display.

8. A user interface unit as recited in claim 5 wherein the preview browse user interface presents a first list of criteria from which a user can select a criteria, and upon selection of the criteria, the preview browse interface presents a second list of video content programs that meet that selected criteria from the first list.

9. A headend server accessible through a browser user interface, the browser interface capable of displaying media stored in the headend server, the headend server comprising:

an SQL database server that includes program IDs for full length video programs, trailer IDs for preview video trailers, viewer IDs for viewers wherein a first join table correlates program IDs and star IDs, a second join table correlates program IDs and trailer IDs, a third join table correlates program IDs and viewer IDs, and a viewer table associates viewer IDs and viewers and wherein the program IDs and the trailer IDs are usable as shorthand ID tags for rapid search of the SQL database;

a continuous media server that includes the full length video programs and the preview video trailers; and the headend server responsive to an order request from the browser user interface wherein the SQL database server associates user information; and at least one of the full length video programs and the preview video trailers and wherein the continuous media server provides access to the at least one of the full length video programs and the preview video trailers.

10. A headend server of claim 9 wherein the order request from the browser user interface corresponds to a full length video program associated with a preview video trailer displayed on the browser user interface.

11. A headend server of claim 9 wherein the continuous media server further comprises at least two pointers, the at least two pointers capable of simultaneously indexing media in a single media file to allow for access to media from the single media file by at least two users at the same time.

12. An SQL database comprising:

an input to receive search commands;

an output to communicate search results;

program IDs for full length video programs stored in a continuous media database;

trailer IDs for preview video trailers stored in the continuous media database;

viewer IDs for viewers;

star IDs for stars;

a first join table that correlates program IDs and star IDs;

a second join table that correlates program IDs and trailer IDs;

a third join table that correlates program IDs and viewer IDs;

a viewer table that associates viewer IDs and viewers; and wherein the program IDs and the trailer IDs are usable as shorthand ID tags for rapid search of the SQL database.

13. The SQL database of claim 12 wherein the search results facilitate access to one or more of the full length video programs and the preview video trailers stored in the continuous media database.

14. The SQL database of claim 12 further comprising program monikers for the full length video programs and trailer monikers for the preview video trailers.

15. The SQL database of claim 14 wherein the monikers facilitate access to the full length video programs and the preview video trailers.

16. The SQL database of claim 14 wherein the search results include at least one of the program monikers and the trailer monikers.

17. A method comprising:

identifying a full length video program having an associated moniker that facilitates access to the full length video program in a continuous media database and an associated program ID that serves as a shorthand ID tag for rapid search of an SQL database;

correlating the program ID with a star ID using a first join table;

correlating the program ID with a trailer ID using a second join table wherein the program ID and trailer ID serves as a shorthand ID tag for rapid search of the SQL database;

correlating the program ID with a viewer ID using a third join table; and associating the viewer ID with a viewer, using a viewer table;

wherein the trailer ID has an associated preview video trailer and an associated moniker that facilitates access to the preview video trailer in a continuous media database.

18. The method of claim 17 further comprising communicating the moniker to a user interface unit.

* * * * *

UNITED STATES PATENT AND TRADEMARK OFFICE
CERTIFICATE OF CORRECTION

PATENT NO. : 6,668,377 B1
DATED : December 23, 2003
INVENTOR(S) : Dunn

It is certified that error appears in the above-identified patent and that said Letters Patent is hereby corrected as shown below:

<u>Title page,</u>
Item [56], References Cited, U.S. PATENT DOCUMENTS, replace "4,076,121" with -- 4,706,121 --

Signed and Sealed this

Twenty-ninth Day of June, 2004

JON W. DUDAS
*Acting Director of the United States Patent and Trademark Office*